UNITED STATES PATENT OFFICE.

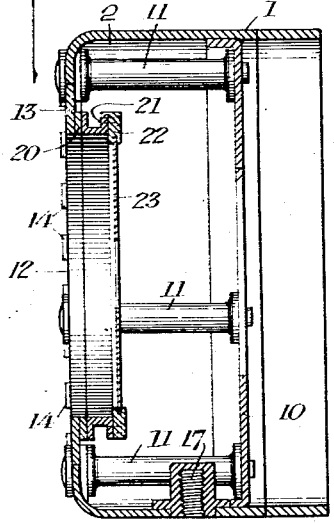

JULIEN TESSIER, OF ROCHESTER, NEW YORK, ASSIGNOR TO EASTMAN KODAK COMPANY, OF ROCHESTER, NEW YORK, A CORPORATION OF NEW YORK.

COLOR-SCREEN CARRIER.

1,398,952.  Specification of Letters Patent.  Patented Nov. 29, 1921.

Application filed May 3, 1920. Serial No. 378,614.

*To all whom it may concern:*

Be it known that I, JULIEN TESSIER, citizen of the Republic of France, residing at Rochester, in the county of Monroe and State of New York, have invented certain new and useful Improvements in Color-Screen Carriers, of which the following is a full, clear, and exact specification.

This invention relates to a color screen carrier and particularly to one that may be readily moved from operative position to permit focusing by white light on a focusing screen.

The embodiment herein shown and described is intended particularly for use with and as a part of a camera designed for taking three simultaneous color records, and described as a whole in my companion application Serial No. 378,611, filed May 3, 1920.

The objects of my invention are to provide a holder for color screens which will be normally concealed and protected, but which is readily accessible for inspection, removal, adjustment and repair, and which is mounted so that it can be readily shifted to either of two positions, one in line with the lenses, and one removed therefrom; and to provide means for definitely fixing these positions and maintaining the holder in each of them, and for operating the holder from outside the camera to both positions. Further objects will appear hereinafter.

Reference will now be made to the drawings in which the same reference characters refer to the same parts throughout:

Figure 1 is a section through the camera front and screen support taken on line 1—1 of Fig. 3;

Fig. 2 is an elevation of the screen carrier in one position on its support;

Fig. 3 is an elevation of the carrier in another position;

Fig. 4 is an elevation of the main frame of the carrier;

Fig. 5 is a section on line 5—5 of Fig. 4;

Fig. 6 is an elevation of a plate that holds the screen in place on the carrier.

The camera 1 has a top 2 and a front 12, in which is mounted by hinges 14 a door 13, which may be secured in closed position by latch 15. Partition 10, braces 11, and tripod screw 17 are parts of the camera structure not of importance in connection with this invention. In the door is a circular opening and the door is adapted to carry a lens mount 18, particularly such a one as is shown in the above entitled application and is more particularly described and claimed in another application Serial No. 378,615 filed May 3, 1920.

This lens mount 18 carries three lenses 16, but the details thereof are not here shown as its relation to the present invention resides in the location of the lenses here indicated and not in the particular structure of the mount. On the rear of the door and around the opening is a flange 20 and to this is secured a supporting plate 21, carrying at its upper and lower edges guide members 22 having facing grooves in which slides a plate 23. The upper edge of the plate has a slot 24 therein, the end walls of which engage a pin 25 in the groove and determine two end positions of the slide. A pintle 26 extends through the door and carries on its outer end an operating handle 15' and on its inner end a rigid arm 27, to which is pivotally connected at 28 the pitman 29 which is in turn pivoted to the sliding plate 23 at 30. A contractile spring 31 is secured to the upper guide at 32 directly above pivot 26 and to the arm 27 at 27'. It is obvious that this spring tends to hold the arm upon whichever side of the pivot it happens to be and thus holds the slide definitely in either end position as determined by the slot and pin connection described.

From the plate 23 are struck up ears to form overhanging flanges 34 and opposite these are mounted cam latches 35. A filter carrier 36 is engaged under the flanges and by the latches and thus held in position.

This filter carrier comprises an elongated main frame 37 shown in Fig. 4, made of a sheet of metal having overhanging flanges 38 at the side edges, and having therein three openings 39, the material immediately around the openings being struck down to form seats 40. The individual color filters or screens 41 are of a size to fit these seats and are placed therein, the upper surfaces of these filters being then flush with the surface of the frame 37. A metal sheet 42 shown in Fig. 5 is then thrust into the frame and under the side flanges. It has openings 43 registering with openings 39, and smaller than the filters 41 which are thus held securely in position. Frame 37 has a small opening 44, at one end, and plate 42 a similar opening 45. The filter carrier is placed in position on the support with the plate 42 inside. The openings 44 and 45 register with and engage a pin 46 carried by plate 23, which thus insures the proper registration of the openings 39 and 43, and of the filters in their position with respect to the lenses. It further insures that the filter carrier will always be positioned with the same end uppermost, so that unless the filters are changed, they will always be in the same relative position. The exposure areas on the plate are thus easily identified and there is little chance of confusion. Plate 23 has therein an opening in the shape of a T lying upon its side, the cross part of which underlies the screens and the stem part of which is shown at 47. When the filter carrier is in the position shown at the left in the figures this space 40 is opposite the central one of the lenses 16 and the rays from this lens pass to a suitable focusing screen where they may be more clearly seen than if they had to pass through a color screen. After focusing, the handle 15' is turned to move the plate to the position shown in Fig. 2, and the color record image from each lens is thrown upon its proper part of the exposure area.

It is thus apparent that I have produced a screen carrier that is readily assembled, that is ordinarily well protected, but is nevertheless readily accessible and which may be conveniently manipulated to permit focusing by white light. I consider as within my invention not only such details as are specifically described and shown in this embodiment but also all such mechanical equivalents as may be considered to be within the scope of the appended claims.

Having thus described my invention, what I claim as new and desire to secure by Letters Patent is:

1. In combination, a casing, a hinged door adapted to carry a lens in a fixed position, said door carrying a plate slidable thereon to two determinate positions, said plate having a focusing opening which at one position is opposite said lens, and carrying a color filter which at the other of said positions is opposite said lens, an operating handle for said plate on the front of the door, and a spring controlled by said handle and tending to hold said plate in each of its positions.

2. In combination, a frame adapted to carry a plurality of lenses in definite positions, said frame having a plate slidable to two determinate positions, said plate having an opening which at one of its positions is opposite at least one of said lens positions, said plate having a series of filters, which in the other position of said plate are positioned respectively behind the positions of said lenses.

3. In combination, a frame adapted to carry a plurality of lenses in definite positions, said frame carrying a slidable plate, coöperating abutments on the plate and the frame determining two fixed positions of said plate, a handle for operating said plate and a single spring for holding the plate at each position, said plate having a focusing opening opposite at least one lens position when the plate is in one position and carrying a series of color filters which register with the respective lens positions when the plate is in its other position.

4. In combination, a casing, a door hinged thereon, and adapted to carry a plurality of lenses in definite position, a removable filter holder on the rear of said door and accessible only when said door is open, said holder comprising a plate having a series of pressed out open seats adapted to contain individual filters, a slideway on each side of said seats, and a slide in said slideways and having a series of apertures, with the apertures opposite the seats and adapted to retain the filters in the seats.

5. In combination with a camera casing, a hinged door upon the front thereof adapted to carry a plurality of lenses in definite positions upon the front thereof, said door having upon the rear thereof a slideway, a plate slidable in said slideway, means for holding the plate in two determinate positions, said plate carrying a set of color filters which when the plate is in one of its positions are positioned respectively behind the lenses, said plate having a focusing opening which when the plate is in other position is positioned behind one of the lenses, and a handle on the front of the door by which the plate may be moved from one position to the other.

6. In combination with a casing, a hinged door adapted to carry a plurality of lenses in definite position upon the front thereof, a plate slidable upon the rear of the door to two determinate positions, and having a focusing aperture opposite at least one of the lenses when the plate is in one position, a removable filter holder on said plate carrying a series of filters which, when the plate is in the other position are positioned respectively behind the lenses, and means on the front of the door for moving said slide, said filter being accessible only when the door is open.

7. In combination, a support and a color filter carrier, said support having means for securing the edges of the carrier, the carrier comprising a flanged frame having apertured seats in which color filters may be placed and an apertured plate adapted to be inserted beneath the flanges of the plate and to hold filters in position in the seats, said frame and plate and support having coöperating registering means, whereby the apertures of the plate and frame are properly registered with respect to each other and with respect to the support.

Signed at Rochester, New York, this 29th day of April, 1920.

J. TESSIER.